United States Patent [19]

Strommer et al.

[11] 3,754,926

[45] Aug. 28, 1973

[54] METHOD FOR TEXTURIZING PROTEIN MATERIAL

[75] Inventors: Palmer K. Strommer, Osseo; Charles I. Beck, Wayzata, both of Minn.

[73] Assignee: General Mills, Inc., Minneapolis, Minn.

[22] Filed: July 27, 1970

[21] Appl. No.: 58,317

[52] U.S. Cl. .......................................... 99/17, 99/14
[51] Int. Cl. ................................................ A23j 3/00
[58] Field of Search ...................... 99/14, 17, 82, 98, 99/1, 238

[56] References Cited
UNITED STATES PATENTS

| | | | |
|---|---|---|---|
| 2,278,468 | 4/1942 | Musher | 99/98 |
| 3,488,770 | 1/1970 | Atkinson | 99/17 |
| 3,142,571 | 7/1964 | McAnelly | 99/14 |
| 2,478,438 | 8/1949 | Thompson et al. | 99/82 |
| 3,272,110 | 9/1966 | Tsuchiya | 99/238 R |
| 3,231,387 | 1/1966 | Tsuchiya et al. | 99/238 R |
| 3,288,053 | 11/1966 | Perttula | 99/238 R |

*Primary Examiner*—A. Louis Monacell
*Assistant Examiner*—James Robert Hoffman
*Attorney*—Anthony A. Juettner, Gene O. Enockson and Norman P. Friederichs

[57] ABSTRACT

A method is provided for texturizing protein material by treating the material in the presence of steam at an elevated gaseous pressure and an elevated temperature.

17 Claims, 8 Drawing Figures

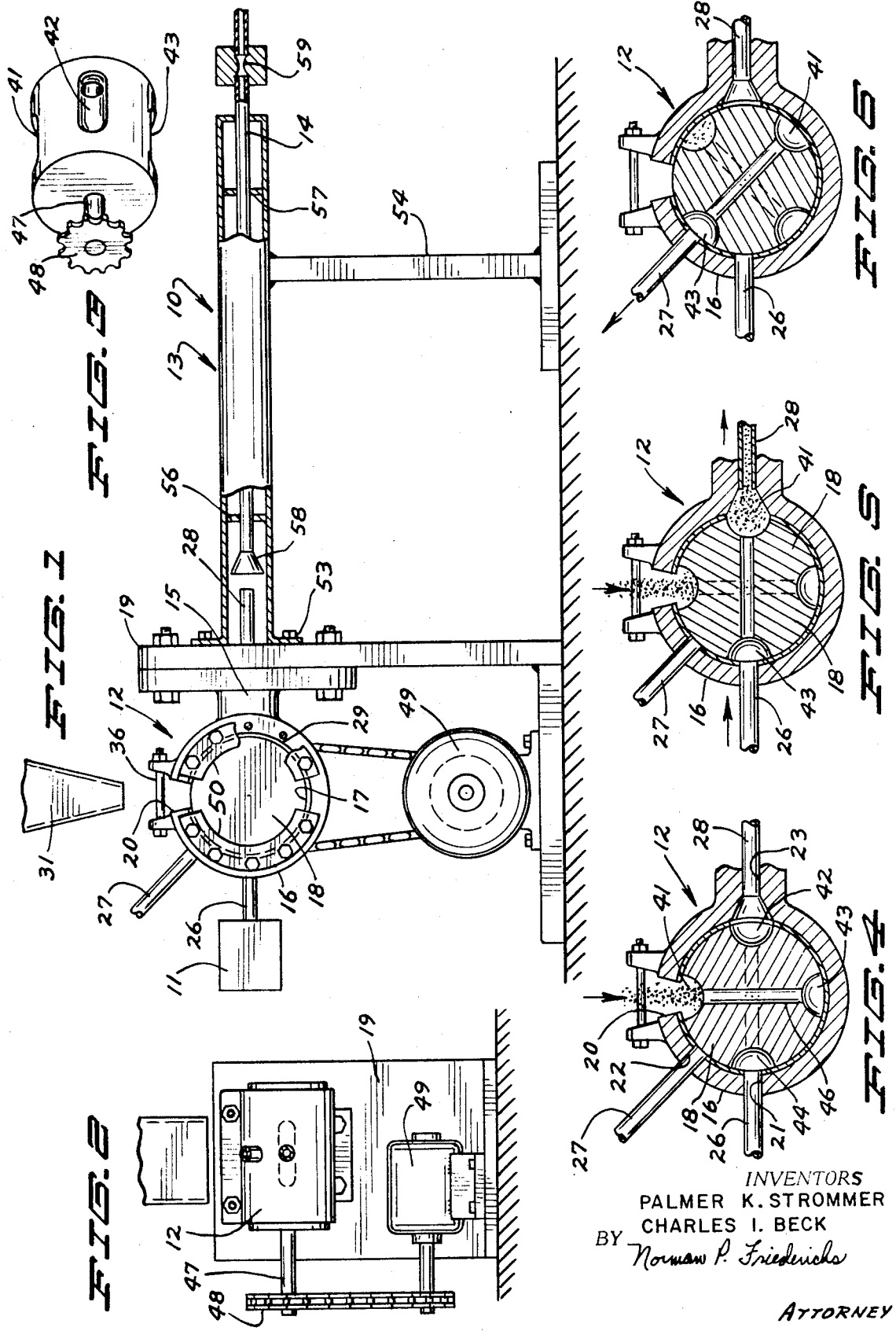

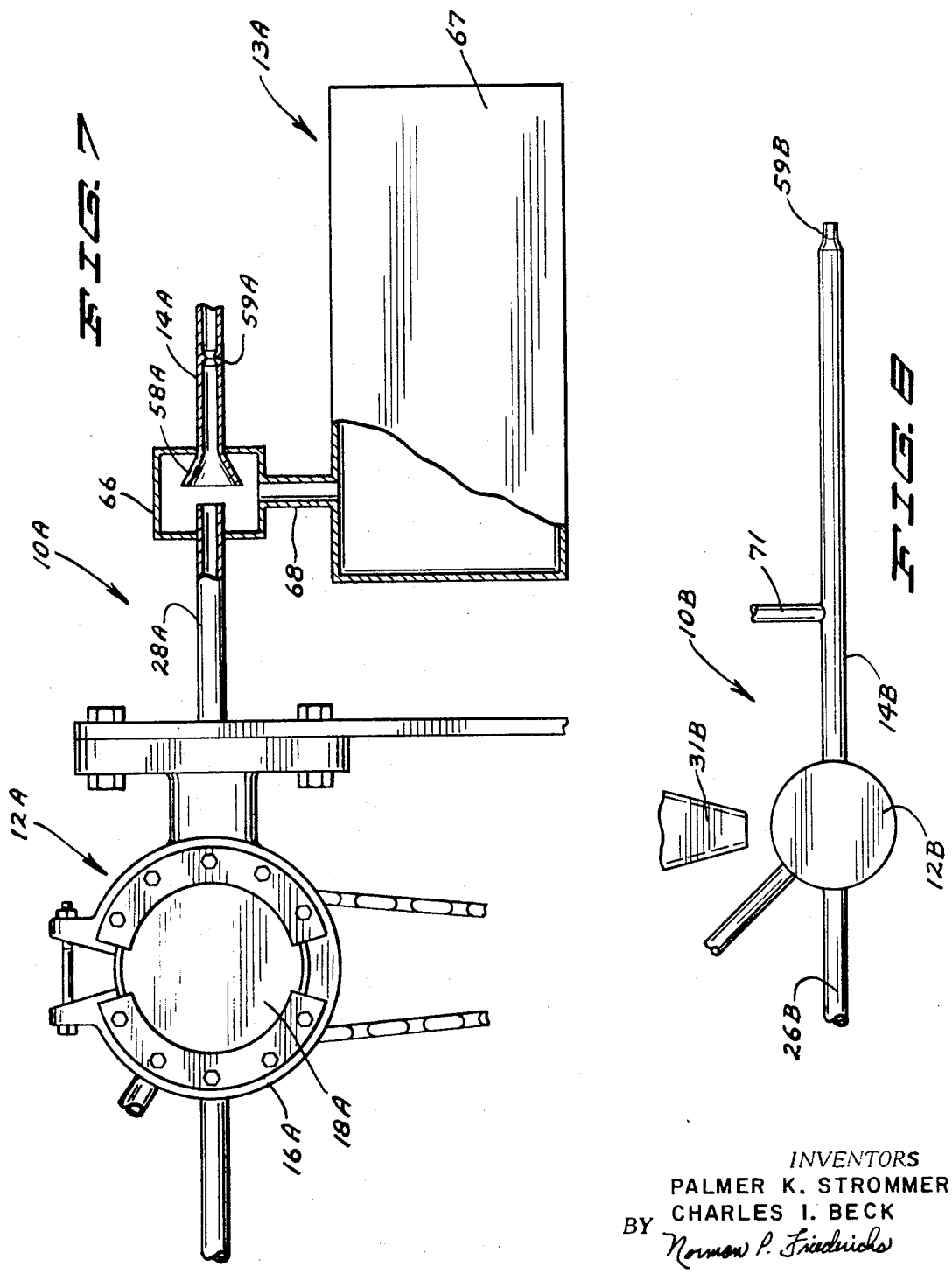

METHOD FOR TEXTURIZING PROTEIN MATERIAL

BACKGROUND OF THE PRESENT INVENTION

The present invention relates to a method for treating food products and more particularly to a method for texturizing fine particulate protein food products.

In recent years substantial effort has been directed toward treating vegetable protein materials so as to provide such materials with texture and other characteristics commonly found in animal meat products. The vegetable protein materials are primarily soybean meal and flour, however, various other oil seed meals and flours also are used, such as peanut, cottonseed and sesame seed meals and flours. It is generally preferred to use protein concentrates of such oil seed meals, typically including at least about 50 percent protein by weight.

Various types of methods and apparatus have been used in the past to texturize the vegetable protein material. For example, solubilized soy protein has been extruded into an acid bath thereby forming texturized fibers. Untexturized protein material contains protein in discrete particles. Texturization takes place when the protein acquires a substantially continuous phase. The texturized material, when moist, is somewhat tough or chewy much like meat. The term "texturizing" as used herein will refer to the process of changing the discrete particles of protein into continuous phase protein.

THE PRESENT INVENTION

The present invention provides a new method for texturizing protein material in a texturizing apparatus under a steam pressure and an elevated temperature.

The protein material in the present invention is treated under relatively mild conditions. For example, the residence time of the protein material in the apparatus of the present invention may be less than one second. The material being texturized in the present invention is not mechanically worked. Treatment of the protein material under such relatively mild conditions results in a texturized product having certain highly desirable characteristics. In particular, the product is quite bland.

The protein material to be processed according to the present invention may be of the type used in previous texturizing processes. This typically includes the various defatted oil seed meals and flours such as soybean, peanut, cottonseed and sesame. Various other untextured protein materials such as wheat gluten, yeast, sodium caseinate and the like may be texturized according to the present invention. The protein material used in the present invention is preferably a flour or flour-like material, particularly soybean.

Apparatus suitable for carrying out texturization according to the present invention is shown in the drawings as follows:

FIG. 1 shows a side view of the apparatus with portions broken away.

FIG. 2 shows an end view of the apparatus.

FIG. 3 shows a portion of a valve of the apparatus.

FIGS. 4 – 6 show cross sectional views of the valve in various positions of operation.

FIG. 7 shows alternative apparatus that may be used in carrying out the present invention.

FIG. 8 shows another type of apparatus that may be used in carrying out the present invention.

The texturizing apparatus 10 (FIG. 1) may include a rotary valve 12, a pressure tank 13 and a tube 14. The texturizing apparatus 10 is connected to a high pressure fluid source 11 such as a steam boiler which should be capable of providing a fluid or steam pressure to the rotary valve 12 sufficient to texturize the protein material.

The rotary valve 12 may include a valve housing 16 with an opening or chamber 17 for reception of the rotary valve member or plug 18. The valve housing 16 has a base 15 for support of the valve 12 on bracket 19. The valve housing 16 has an upper opening 20 which serves as an inlet for material to be texturized. The housing 16 (FIG. 4) further includes openings 21, 22 and 23 for reception of pipes 26, 27 and 28, respectively. The pipes, for example, may be threadedly engaged in said openings. The pipe 26 is connected to the steam source 11 and feeds the pressurized steam to the valve 12. Pipe 27 is an exhaust pipe which depressurizes any residual steam pressure in valve 12 prior to feeding of protein material to the valve 12 through opening 20. Pipe 28 is the outlet through which protein material leaves valve 12. A hopper 31 (FIG. 1) may be provided for feeding protein material to opening 20 in valve 12. The housing 16 has a bearing member 29 located in chamber 17 for rotatable support of the valve member 18. The bearing member 29 extends substantially around chamber 17 except for suitable openings which cooperate with openings 20, 21, 22 and 23 in housing 16. The valve housing 16 has a tightening means such as a bolt or screw 36 for drawing the housing 16 and bearing 29 tightly against the rotary valve member 18 thereby providing a steam seal between bearing 29 and the rotary valve member 18. The bearing 29 may be constructed from a brass cylinder.

The rotary valve member 18 (FIGS. 2 – 6) may be of steel and may be constructed from a solid cylinder or alternatively it may be formed by casting. The member 18 is provided with any desired number of material conveying pockets such as 41, 42, 43 and 44. The member 18 will normally have an even number of such pockets, typically four, six or eight. A passageway 46 is provided between each pair of pockets such as pockets 41 and 43, for purposes hereinafter described. The rotary valve member 18 has a shaft 47 and a sprocket 48 for driven engagement with suitable power means such as motor 49 (FIG. 1). The valve member 18 may be held in position in housing 16 by restraining plates, such as plate 50 which is secured to housing 16 by screws.

The pressure tank or surge tank 13 and the tube 14 in the embodiment shown in FIG. 1 may be concentric pipes. The pressure tank 13 may be secured to the support bracket 19 by flange 53. The pressure tank 13 may be further supported by one or more legs such as leg 54. The pressure tank 13 is sealed from the atmosphere except through tube 14. The tube 14 is mounted in pressure tank 13 such as by spider flanges 56 and 57. If desired, a portion 58 of tube 14 nearest to valve 12 may be flared radially outwardly for ready reception of the protein material from pipe 28. Space is provided between the outermost edge of flared portion 58 and the adjacent wall of pressure tank 13 so that the pressure may equalize throughout tank 13.

The tube 14 may have a restricted orifice or nozzle 59 which limits the escape of pressure from the texturizing apparatus 10 thereby providing a build up of pressure in tank 13. Alternatively the diameter of the tube 14 may be sufficient restriction to provide the necessary build up of pressure. The restriction maintains a pressure in the pressure tank 13 sufficient to provide texturization of protein in the apparatus.

An alternative type of texturizing apparatus 10A that may be used in the present invention is disclosed in FIG. 7. The apparatus 10A may include a rotary valve 12A constructed substantially as discussed with respect to valve 12 of apparatus 10. The valve 12A includes a housing 16A, a rotary valve member 18A and an outlet pipe 28A. The tube 14A is relatively short in this embodiment and includes a flared portion 58A and a nozzle 59A. The pressure tank 13A in this embodiment has a first small compartment 66 which surrounds adjacent portions of the outlet pipe 28A and tube 14A. The first compartment 66 is connected to a second larger compartment or pressure source 67 by a pipe 68. The pipe 68 may be of any desired length and diameter so long as the pressure remains adequate in compartments 66 and 67. This embodiment permits flexibility in utilization of equipment space. For example, the valve 12A and small compartment 66 may be located in one area and the larger compartment may be located in another area. If desired, a secondary pressure source may be applied to either compartment 66 or compartment 67 in order to assist in maintenance of appropriate pressure levels.

The method of the present invention is substantially the same if it is carried out using the texturizing apparatus 10 or texturizing apparatus 10A; therefore, the method will be described as being carried out using the texturizing apparatus 10.

The protein material may be added to the texturizing apparatus 10 such as through the hopper 31. If desired, suitable provision may be made for metering or controlling the amount of feed material passing through hopper 31. The feed material leaving hopper 31 falls through opening 20 in the housing 16 of valve 12 thus being deposited, for example, in pocket 41 as shown in FIG. 4. The valve member 18 may rotate in a clockwise direction such that pocket 41 aligns with pipe 28 and pocket 43 aligns with pipe 26 in FIG. 5. At that point, the residual pressure in tank 13 and the pressure from pipe 26 act on the protein material. The pressure exerted on the protein material is sufficient to provide texturization. Good texturization has been obtained at 30 p.s.i.g. and apparently some texturization has been obtained even at 15 p.s.i.g. The pressure will generally be at least 55 p.s.i.g., preferably 80 to 110 p.s.i.g. The pressure exerted through pipe 26 by the fluid source 11 should be enough greater than the pressure exerted by the tank 13 that the protein material is rapidly forced through pipe 28, tube or chamber 14 and nozzle 59. The fluid provided by source 11 may be a fluid with a high heat transfer coefficient such as steam or a mixture of such a fluid with other gaseous fluid, for example a mixture of steam and air. It is postulated that the texturization takes place immediately upon application of the pressure to the protein material by force from both the steam pipe 26 and the surge tank 13. In any event the protein material is texturized by the time it leaves the nozzle 59. Steam pressure continues to pass through valve 12 and pipe 28 for an instant following expulsion of the protein material from pipe 28. This raises the pressure of tank 13. Of course, some pressure is lost through the tube 14 and nozzle 59 for an instant following expulsion of the piece of protein from nozzle 59. However, the proper pressure may be maintained in tank 13 because of the controlled orifice size in nozzle 59. It has been found that the protein material fails to texturize appreciably if the back pressure from the pressure tank 13 is reduced to below 15 p.s.i.g. The valve member 18 continues to rotate, pocket 43 aligns with exhaust pipe 27 and residual pressure in pockets 41, 43 and passageway 46 is relieved. Pocket 43 then reaches the feed port and is loaded with material to be texturized. The operational process then continues as described with respect to texturization using the pocket 41. Texturization takes place using pockets 42 and 44 substantially as described with respect to pockets 41 and 43. The valve member 18 may be rotated at any desired speed depending upon such things as the size of the pockets, the number of pockets and the feed rate of protein material.

Another texturizing apparatus 10B that has been used to carry out the method of the present invention is shown in FIG. 8. The texturizing apparatus 10B is constructed similar to apparatus 10 and includes a fluid or steam supply line 26B, a rotary valve 12B, a hopper 31B and a texturizing tube or chamber 14B. The rotary valve 12B may be constructed identical to rotary valve 12 and operates in the same manner. The texturizing tube 14B is constructed much like tube 14 and includes a nozzle 59B and a water injection pipe 71. The texturizing apparatus 10B does not include a surge tank for exerting back pressure. Instead the water, which is injected into tube 14B through pipe 71, replaces the surge tank. In all other respects, the apparatus 10B is believed to operate much the same as apparatus 10.

The process of the present invention may be carried out using various starting materials and various operating conditions. The untextured protein may be a vegetable protein, such as soybean protein, a protist protein, such as yeast and other microbials, or animal protein, such as casein. The untextured feed material may be a typical defatted oil seed flour such as soybean flour, it may be a concentrate such as a soybean concentrate, or an isolate such as a soybean isolate. A material having a protein content as low as 30 percent (dry weight basis) and as high as 95 percent has been satisfactorily texturized according to the present invention. It has been found that the degree of texturization increases as the protein content is increased. For most uses of textured protein contemplated by the present invention, the protein content should be at least 50 percent, preferably about 55 to 75 percent. The term "percent" as used herein will refer to percent by dry weight unless otherwise specified.

Protein material, having a moisture content as low as 4 to 6 percent and as high as 40 percent by weight, has been texturized according to the present invention. Materials having moisture contents above 40 percent may be texturized according to the present invention; however, they tend to become sticky and difficult to handle. It has been found that increasing moisture content increases texturization. The maximum moisture content is believed to be limited only by the particular texturizing apparatus used. The range of moisture in the feed material is preferably between 16 and 26 percent and generally between 18 and 24 percent.

The maximum pressure used in carrying out the present invention is limited only by the particular apparatus used. In carrying out the invention using the apparatus shown in FIG. 1, pressures as high as 140 p.s.i.g. and as low as 15 p.s.i.g. have been used. It has been found that an increase in pressure generally results in an increase in texturization and/or expansion. The preferred pressure conditions of the present invention are at least 25 p.s.i.g., generally at least 55 p.s.i.g., typically 80 to 110 p.s.i.g. The temperature of steam at 15 p.s.i.g. is 250°F., therefore, the temperature in the present invention is at least 250°F.

The present invention provides textured protein having acceptable water holding capacity and acceptable texture. The water holding capacity of the textured protein is desirably in the range of 2 to 3 for most uses such as meat extending uses. The water holding capacity of the protein may be less in other uses, such as 1.5 in simulated beef chunks. The term "water holding capacity" as used herein refers to the total amount of water the protein material is able to hold and is determined by soaking the texturized protein in an excess of water for 20 minutes and then draining for five minutes. The water holding capacity is equal to the wet weight minus the dry weight and that value divided by the dry weight. Texture of the protein material may be measured in shear press values. Shear press values for texturized protein of the present invention will generally be in the range of 300 to 1,500 pounds as determined by the following procedure. Sample is prepared for measurement by weighing out 75 grams (dry weight basis) of texturized protein material. The sample is placed in an excess of cold water and soaked at about 40°F. for 1.5 hours. The sample is drained for five minutes and divided into 3 equal parts by weight. The three parts are wrapped in plastic and allowed to stand at room temperature for 20 minutes. Each of the parts are tested in the Allo-Kramer Shear Press (Ser. No. 1042, Model No-5-2H) using a 10 bladed head according to conventional techniques using a 2,500 pound ring and the three values are added together.

Protein which has been texturized according to the present invention is quite different from protein which has been texturized according to previously known processes. For example, the texturized protein has a taste which is surprisingly mild and bland. The processed protein material leaves the apparatus as discrete chunks rather than as a rope and thus is ideal for preparing simulated chunks of beef. The product has a puffed-like structure with smaller voids than that of previously known texturized protein. Also, the voids are of random orientation. The texturized protein material appears to be layered. The texturized material, prior to rehydration, is very stable on storage and does not require drying.

The textured protein of the present invention may be used for the same purposes and in substantially the same manner as previously known types of texturized protein. The protein material, as it comes from the texturizing apparatus, may be impregnated with conventional meat analog serum typically including binder, flavoring and water, thereby producing a simulated beef chunk or a simulated chicken chunk. The protein material may be ground, such as with a Comitrol Cutter, hydrated and mixed with ground beef or pork sausage, thus acting as a meat extender. Alternatively, the texturized material may be finely chopped and impregnated with a conventional meat analog serum, thereby producing a simulated ground beef or simulated ground pork. For example, simulated ground beef may be prepared by mixing, by weight, about 3.5 parts beef tallow, 4.3 parts corn flour, 1.7 parts egg albumin, 1.2 parts brown sugar, 1.2 parts onion powder, 1.0 parts salt, 50 parts water, 24 parts texturized protein material, beef flavoring and sufficient caramel coloring to obtain the desired cooked hamburger color. The mixture may be heated to set the egg albumin.

The following examples are illustrative of the present invention and are not intended for purposes of limitation.

EXAMPLE I

Texturized protein material was prepared according to the present invention from a dry blended mixture containing 140 parts soybean concentrate (Textrol is a processed soy protein material having a minimum protein content of 63.5 percent and produced by Central Soya Co. Inc.), 60 parts soybean isolate (Promine R is an isolated soy protein material having a protein content of about 95 percent and produced by Central Soya Co. Inc.), 1 part glycerol mono stearate (Myvaplex 601 is a food grade concentrated glyceryl mono stearate produced by DPI Division of Eastman Chemical Products Inc.) and 2 parts caramel color. The term "parts" as used herein will refer to parts by weight, on an as is moisture basis, the moisture content normally being about 6 percent. The total moisture content of the mixture was raised to 20 percent by weight. The moistened flour-like mixture was then fed at the rate of about 10 pounds per minute to texturizing apparatus constructed substantially as shown in FIGS. 1–6. The pressure tank 13 was a pipe having a ten inch internal diameter and a length of 12 feet. The tube 14 was a 1 ½ inch pipe mounted concentrically within the pressure tank 13. The nozzle had an orifice of seven-eighths inch diameter. The tube had a length of 13 feet. The plug 18 rotated at a rate of 32 revolutions per minute. The temperature of the steam fed to the valve 12 was 450°F. and the pressure in the steam pipe 26 was 120 p.s.i.g. The pressure in the tank 13 was maintained at about 70 p.s.i.g. plus or minus 4 p.s.i.g. The material leaving the nozzle was well textured and had a moisture content of about 17.5 percent by weight. The texturized material had a shear press value of 700 pounds and a water holding capacity of 1.9. The texturized material was used as a meat extender by finely chopping with a Comitrol Cutter, hydrating by soaking in water for 20 minutes and mixing with hamburger in a 1:4 ratio (extender to hamburger). The texturized material was found to be a very good extender for meat.

EXAMPLE II

Texturized protein material was prepared from a dry blended mixture including 100 parts soy flour (Nutrisoy is a defatted low heat soy flour having a protein content of about 50 percent and is produced by Archer Daniels Midland Co.), 1/2 part glycerol mono stearate (Myvaplex 601) and 2 parts caramel. The total moisture content was raised to about 21 percent by weight. The apparatus was substantially as described in Example I except that the pressure tank 13 had a 6 inch internal diameter. The plug 18 contained 6 pockets and the material feed rate was 6 pounds per minute. The temperature of the steam fed to the valve 12 was 430°F. and the steam pressure was 180 p.s.i.g. The pressure in the surge tank was maintained between 90 and 100 p.s.i.g. The material leaving the seven-eighths inch nozzle was well textured, had a shear press value of 350 pounds and a water holding capacity of 2.4. The texturized material was chopped with a Comitrol Cutter, hydrated by soaking in water for about 20 minutes and mixed with pork sausage in a 1:4 ratio (extender to sausage). The material was found to serve satisfactorily as a sausage extender.

EXAMPLE III

Texturized protein material was prepared from defatted cottonseed flour. The flour was glandless cottonseed flour produced by Producers Cooperative Oil Mill and contained about 60 percent protein. Sample III–A was prepared from 100 parts cottonseed flour. Sample III–B was prepared from a mixture of 90 parts cottonseed flour and 10 parts soy protein isolate (Promine R), by weight. Sample III–C was prepared from a mixture of 80 parts cottonseed flour and 20 parts soy protein isolate (Promine R). The moisture content in each instance was raised to 17 percent. The apparatus and processing conditions were as described in Example II except that the feed rate was about 2 to 3 pounds per minute. The protein material in each instance was texturized. The texturized material was dried to a moisture content of about 5 to 7 percent. The water holding capacities were as follows: Sample III–A 1.8; Sample III–B 1.7; Sample III–C 1.6. The shear press characteristics were as follows: Sample III–A 361 pounds; Sample III–B 505 pounds; Sample III–C 590 pounds.

EXAMPLE IV

Texturized protein material was prepared from yeast flour The yeast flour was obtained from Northwest Brewers Yeast, Inc. that had been jet milled to break the yeast cells. The yeast flour was jet milled in a Jet-O-Mizer using dry air at a pressure of 80 p.s.i.g. The yeast flour was passed twice through the Jet-O-Mizer. The moisture of the yeast flour was then raised to 20.5 percent. The temperature of the steam fed to the valve of the texturizing apparatus was 450°F. The pressure in the pressure tank was maintained at 80 p.s.i.g. plus or minus 4 p.s.i.g. The jet milled yeast flour was fed to the texturizing apparatus at the rate of about 8 pounds per minute. The material leaving the apparatus was found to be texturized. The product had a water holding capacity of 1.7 and a shear press value of 225.

EXAMPLE V

Texturized protein material was prepared from gluten (produced by General Mills, Inc. under the designation Pro 80) under the following conditions: surge tank pressure 100 p.s.i.g.; steam temperature 450°F.; steam pressure 180 p.s.i.g.; feed rate 6 to 8 pounds per minute and moisture content of feed material about 5 percent.

EXAMPLE VII

Texturized protein material was prepared in which flavoring was added to the material prior to texturization. A dry blend was prepared including 70 parts soybean concentrate (Textrol), 30 parts soybean isolate (Promine R), 2 parts sugar, 3 parts onion powder, 3 parts caramel, 6 parts hydrolyzed protein flavoring (beef flavor) and 0.3 parts red coloring. The moisture content was raised to 19 percent. The resulting material was fed to the texturizing apparatus at a rate of about 7 pounds per minute. The pressure in the tank 13 was maintained at 95 p.s.i.g. Steam fed to valve 12 was at a pressure of 120 p.s.i.g. and a temperature of 430°F. The protein leaving the apparatus was texturized and was flavored.

EXAMPLE VIII

The following illustrates the present invention using various pressures in the surge tank. A mixture containing by weight 70 parts soybean concentrates (Textrol), 30 parts soybean isolate (Promine R) and one-half part glycerol mono stearate was dry blended and the moisture content was raised to 21 percent. The mixture was then fed to the apparatus described in Example I at a rate of between 8 and 10 pounds per minute. The feed steam temperature was 450°F. During treatment of Sample VIII–A, the pressure in the tank 13 was maintained at about 77 p.s.i.g. The material texturized very well and contained a very small amount of fine loose particles. Sample VIII–B was prepared using a pressure of about 70 p.s.i.g. in the pressure tank. Sample VIII–B was well textured, however, not quite as well as Sample VIII–A. Sample VIII–B contained a larger amount of fine loose particles than Sample VIII–A. Sample VIII–C was prepared using a pressure of about 75 p.s.i.g. in the pressure tank. Sample VIII–D was prepared using a pressure of 55 p.s.i.g. in the pressure tank. Sample VIII–E was prepared using a pressure of 45 p.s.i.g. As the pressure in tank 13 was reduced, the degree of texturization was found to decrease and the amount of fine particles was found to increase. It was found that the fine particles could be recycled through the apparatus and again texturized to form larger pieces. The samples VIII–A through VIII–E were all found to texturize. Sample VIII–A had a waterholding capacity of 1.8 and a shear press value of 800 pounds. Sample VIII–B had a water holding capacity of 1.8 and a shear press value of 760 pounds. Sample VIII–C had a water holding capacity of 1.7 and a shear value of 755 pounds. Sample VIII–D had a water holding capacity of 1.7 and a shear press value of 750 pounds. Sample VIII–E had a water holding capacity of 1.8.

EXAMPLE IX

The following illustrates the present invention using various low pressures in the surge tank. The protein feed material was soybean isolate (Promine R) having a moisture content of 22.5 percent. The texturizing apparatus was constructed substantially as described in Example I except that the nozzle was provided with a variable orifice so that the surge tank pressure could be controlled. The temperature of the steam fed to the rotary valve was 425°F. The pressures in the surge tank were as follows: Sample IX–A 30 p.s.i.g.; Sample IX–B 25 p.s.i.g.; Sample IX–C 20 p.s.i.g.; Sample IX–D 15 p.s.i.g. Samples IX–A and IX–B were textured. Samples IX–C and IX–C appeared to be textured but not as well textured as the samples produced at higher pressures.

EXAMPLE X

The following illustrates the present invention using various pressures in the surge tank. The protein feed material in each instance included 70 parts soybean concentrate (Textrol), 30 parts soybean isolate (Promine R) and one-half part glycerol mono stearate. The total moisture content was raised to 19.5. The mixture was fed to the apparatus described in Example I at the rate of 8 to 10 pounds per minute. The temperature of the steam fed to the rotary valve was 430°F. The pressure was as shown in Table I.

TABLE I

| Sample | Pressure Surge Tank | Shear Press Values | Water Holding Capacity |
|---|---|---|---|
| X-A | 55-65 | not determined | 1.5 |
| X-B | 65-75 | 856 | 2.0 |
| X-C | 90-100 | 749 | 2.3 |
| X-D | 120-130 | 677 | 2.1 |

EXAMPLE XI

Protein materials having various protein contents were texturized according to the present invention. The protein material was a dry blended mixture of soybean flour (Nutrisoy) and wheat flour. The protein content was adjusted by the proportion of wheat flour to the mixture. The texturizing apparatus was as described in Example I. The nozzle had a three-fourth inch orifice. The protein material feed rate was about 6 pounds per minute. The pressure in the surge tank was about 80 p.s.i.g. The remaining operating conditions were as shown in Table II. All of the samples were found to be texturized.

Table II

| Sample | Protein Content (% dry weight) | Moisture (percent) | Steam Feed Temperature, °F. |
|---|---|---|---|
| X-A | 50 | 20 | 375 |
| X-B | 45 | 21 | 400 |
| X-C | 40 | 19 | 375 |
| X-D | 35 | 18.5 | 375 |
| X-E | 30 | 19 | 375 |

EXAMPLE XII

Protein materials having a low moisture content were texturized according to the present invention. Sample XII-A was soybean flour (nutrisoy) and Sample XII-B was soybean isolate (Promine R). The moisture content of each sample, when fed to the texturizing apparatus, was about 5 percent. The texturizing apparatus was constructed as described in Example I except that the nozzle had an orifice of one-half inch diameter. The protein material feed rate was between 2 and 3 pounds per minute. The pressure in the tank was 120 p.s.i.g. The steam was fed to the rotary valve at 400°F. and 155 p.s.i.g. Both samples were found to yield well textured product.

EXAMPLE XIII

Protein material was prepared according to the present invention using the apparatus shown in FIG. 8. A dry blend was prepared including 70 parts soybean concentrate (Textrol), 30 parts soybean isolate (Promine R) and one-half part glycerol mono stearate. The material, having a moisture of about 6 percent, was fed to the rotary valve 12B at the rate of 6.5 pounds per minute. The steam was supplied to the valve 12B at a temperature of 420°F. and a pressure of 120 p.s.i.g. The tube 14B was a 1 ½ inch pipe. The nozzle 59B had a 1 inch orifice. The water injection pipe 71 was provided with a high pressure nozzle. The water was pumped through pipe 71 under a pressure of 1,200 p.s.i.g. The product was found to be textured.

The embodiments of the invention in which an exclusive property or privilege is claimed are defined as follows:

1. A method for texturizing finely divided untextured protein material having a protein content of at least 30 percent dry weight basis, said method comprising: feeding said finely divided untextured protein material to a confined path through a pressurized zone, the conditions within said zone being maintained at a gaseous pressure of at least 15 p.s.i.g. and a temperature of at least 250°F., the temperature and pressure of said zone being maintained by feeding a heated gaseous fluid comprising steam to said zone; and propelling said protein material into, along and then out of said confined path into a zone of lower pressure, said protein material being propelled by the flow of a heated gaseous fuid comprising steam along said path thereby texurizing said material.

2. The method of claim 1 wherein the zone of lower pressure is at atmospheric pressure.

3. The method of claim 1 wherein the protein material is subjected to opposing forces from pressurized fluids while in said confined path.

4. The method of claim 1 wherein the said pressure in the pressurized zone is at least 25 p.s.i.g.

5. The method of claim 4 wherein said protein content is at least 50 percent and the moisture content of said untextured protein material is in the range of 16 to 26 percent by weight.

6. A method for continuously texturizing flour-like protein material including about 30 percent to 95 percent protein by dry weight basis prior to texturizing, the method comprising: feeding the protein material into a processing chamber, the temperature of said chamber being at least 250°F.; feeding heated gaseous processing fluid, including a fluid having a high heat transfer coefficient, into said chamber from two sources thereby pressurizing said chamber to a pressure of at least 15 p.s.i.g., one of said sources being of sufficient pressure to force the material from said chamber into a zone of reduced temperature and pressure, and said gaseous processing fluid removing said protein material to said zone whereby said protein material is texturized.

7. A method for texturizing protein material comprising: feeding fine particles of a protein material to a processing zone, said protein material containing at least 30 percent protein by dry weight, feeding a heated pressurized gaseous processing fluid including steam into said zone, the temperature of said fluid being at least 250°F. and thereby raising the pressure in said zone to at least 15 p.s.i.g. and applying a greater fluid pressure to said protein material from at least one direction thereby removing said protein material from said processing whereby said protein material is texturized.

8. The method of claim 7 wherein said pressure in the processing zone is at least 55 p.s.i.g.

9. Th method of claim 8 wherein said protein content is between 55 and 75 percent by weight.

10. The method of claim 7 wherein the fluid is superheated steam.

11. A method for texturizing particulate protein containing material comprising: feeding untextured finely divided particulate protein material to a confined elongated treating zone, said untextured protein material having a protein content of about 30 percent to 95 percent dry weight basis, said zone being under a steam pressure of at least 25 p.s.i.g. and a temperature of at least 250°F; subjecting said protein material to the steam pressure of said zone; and simultaneously subjecting said protein material to a steam flow of sufficient magnitude to propel the protein material through the pressurized treating zone and said steam flow removing the protein material to a zone of lower pressure thereby texturizing said protein material.

12. A method for texturizing particulate protein containing material comprising: feeding untextured particulate protein material to a treating chamber, said untextured protein material having a protein content of about 30 percent to 6 percent dry weight basis, said chamber comprising an elongated cylinder having an inlet at one end for receiving said untextured protein material and an outlet at the other end, said chamber being under a steam pressure of at least 25 p.s.i.g. and a temperature of at least 250°F., subjecting said protein material in said inlet with said steam pressure from the direction of said chamber and by a steam flow from the direction of said inlet toward said outlet, said steam flow being of sufficient force to propel said protein material through said elongated cylinder and out of said outlet into an area of lower pressure, and said steam flow removing said protein material to said area of lower pressure thereby texturizing said protein material.

13. The method of claim 12 wherein the untextured protein material has a moisture content of at least 4 percent by weight.

14. The method of claim 13 wherein the untextured protein material has a moisture content of between 16 and 26 percent by weight.

15. The method of claim 12 wherein the pressure is at least 55 p.s.i.g.

16. The method of claim 12 wherein the protein content of said untextured protein material is at least 50 percent.

17. The method of claim 12 wherein the untextured protein containing material includes 55 to 75 percent protein, dry weight basis, and 18 to 24 percent total moisture and wherein said pressure is in the range of 80 to 110 p.s.i.g.

* * * * *

UNITED STATES PATENT OFFICE
CERTIFICATE OF CORRECTION

Patent No. 3,754,926　　　　　　　　　Dated August 28, 1973

Inventor(s) Palmer K. Strommer and Charles I. Beck

It is certified that error appears in the above-identified patent and that said Letters Patent are hereby corrected as shown below:

Column 9, line 16 the word "to" should be --in--

Column 10, line 12, the word "fuid" should be --fluid--

Column 10, line 19, omit the word "the".

Column 10, line 49, between the words "processing whereby" the word --zone-- should be inserted.

Column 11, line 8, the numeral "6" should be deleted and numeral --95-- inserted therefor.

Signed and sealed this 23rd day of July 1974.

(SEAL)
Attest:

McCOY M. GIBSON, JR.　　　　　　　　C. MARSHALL DANN
Attesting Officer　　　　　　　　　　Commissioner of Patents